(12) United States Patent
Hayashi et al.

(10) Patent No.: US 12,282,002 B2
(45) Date of Patent: Apr. 22, 2025

(54) ULTRASONIC INSPECTION METHOD, ULTRASONIC INSPECTION APPARATUS, AND COMPUTER PROGRAM

(71) Applicant: MITSUBISHI HEAVY INDUSTRIES, LTD., Tokyo (JP)

(72) Inventors: Kyohei Hayashi, Tokyo (JP); Masakazu Kamibayashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/928,433

(22) PCT Filed: Jul. 29, 2021

(86) PCT No.: PCT/JP2021/028113
§ 371 (c)(1),
(2) Date: Nov. 29, 2022

(87) PCT Pub. No.: WO2022/054448
PCT Pub. Date: Mar. 17, 2022

(65) Prior Publication Data
US 2023/0213482 A1    Jul. 6, 2023

(30) Foreign Application Priority Data
Sep. 10, 2020   (JP) ................. 2020-152143

(51) Int. Cl.
*G01N 29/06* (2006.01)
*G01N 29/11* (2006.01)
*G01N 29/44* (2006.01)

(52) U.S. Cl.
CPC ............. *G01N 29/06* (2013.01); *G01N 29/11* (2013.01); *G01N 29/44* (2013.01)

(58) Field of Classification Search
CPC ........ G01N 29/06; G01N 29/11; G01N 29/44; G01N 2291/265; G01N 2291/348;
(Continued)

(56) References Cited

U.S. PATENT DOCUMENTS

| 5,184,623 | A | 2/1993 | Mallart |
| 5,186,175 | A | 2/1993 | Hirama et al. |

(Continued)

FOREIGN PATENT DOCUMENTS

| JP | 62-185163 A | 8/1987 |
| JP | 4-231033 A | 8/1992 |

(Continued)

OTHER PUBLICATIONS

Written Opinion of the International Searching Authority for International Application No. PCT/JP2021/028113, dated Oct. 19, 2021, with English translation.

(Continued)

*Primary Examiner* — Jacques M Saint Surin
(74) *Attorney, Agent, or Firm* — Birch, Stewart, Kolasch & Birch, LLP

(57) ABSTRACT

To further reduce the computational load in an inspection process of ultrasonic inspection of an inspection target. An ultrasonic inspection method includes the steps of: collecting data as a result of scanning an inspection target in such a manner that a plurality of probes transmit ultrasonic signals to the inspection target and the probes receive reflected ultrasonic signals from the inspection target; rendering a primary image including a contour and an internal side of the inspection target based on the data as the result of scanning by using a sonic speed of the ultrasonic signals transmitted and received by the probes, the sonic speed being set to a predetermined value regardless of a region through which the ultrasonic signals have passed; and evalu- (Continued)

ating whether an internal flaw is present in the inspection target in the primary image.

13 Claims, 9 Drawing Sheets

(58) Field of Classification Search
CPC ......... G01N 29/4463; G01N 2291/106; G01N 2291/262; G01N 2291/0289
USPC .......................................................... 73/596
See application file for complete search history.

(56) References Cited

U.S. PATENT DOCUMENTS

| | | | | |
|---|---|---|---|---|
| 7,454,973 | B2* | 11/2008 | Baba | G01N 29/449 |
| | | | | 600/443 |
| 8,583,393 | B2* | 11/2013 | Kitazawa | G06T 19/20 |
| | | | | 702/108 |
| 11,054,398 | B2* | 7/2021 | Hayashi | G01N 29/44 |
| 11,415,554 | B2* | 8/2022 | Nara | G01N 29/343 |
| 11,635,411 | B2* | 4/2023 | Ito | G01N 29/4454 |
| | | | | 73/587 |
| 2019/0242858 | A1 | 8/2019 | Yamamoto et al. | |
| 2019/0277807 | A1 | 9/2019 | Hayashi et al. | |
| 2020/0278323 | A1 | 9/2020 | Kwan et al. | |

FOREIGN PATENT DOCUMENTS

| | | |
|---|---|---|
| JP | 2000-19163 A | 1/2000 |
| JP | 2000-312676 A | 11/2000 |
| JP | 2007-170877 A | 7/2007 |
| JP | 2014-68755 A | 4/2014 |
| JP | 2019-138695 A | 8/2019 |
| JP | 2019-158876 A | 9/2019 |
| WO | WO 2019/030815 A1 | 2/2019 |

OTHER PUBLICATIONS

Japanese Office Action for corresponding Japanese Application No. 2020-152143, dated Oct. 3, 2023, with English translation.

* cited by examiner

ULTRASONIC INSPECTION METHOD, ULTRASONIC INSPECTION APPARATUS, AND COMPUTER PROGRAM

FIELD

The present invention relates to an ultrasonic inspection method, an ultrasonic inspection apparatus, and a computer program.

BACKGROUND

Conventionally, there has been a known technology related to an inspection method that detects internal flaws in an inspection target by scanning the inspection target with ultrasonic signals. For example, Patent Literature 1 discloses an ultrasonic flaw detecting method that acquires information about the shape of a surface of a target, and focuses ultrasonic signals to a predetermined position in the target, by setting a delay time of the ultrasonic signals to be output from a plurality of transducers to the target, based on the acquired surface shape information.

CITATION LIST

Patent Literature

Patent Literature 1: Japanese Patent Application Laid-open No. 2007-170877

SUMMARY

Technical Problem

In ultrasonic inspection, the process of synthesizing data as a result of scanning an inspection target tends to generate a high computational load, and the processing time also becomes extended. In particular, when real-time inspection is performed on-site, it is desirable to complete the inspection process promptly. Even if the scan data of the inspection target is acquired first, and the data is synthesized later, it is desirable to reduce the computational load from the viewpoint of reducing the processing time and the costs required for the processing.

The present disclosure is made in view of the foregoing, an object thereof is to further reduce the computational load in the process of detecting flaws in an inspection target during the ultrasonic inspection.

Solution to Problem

To solve the above-described problems and achieve the object, an ultrasonic inspection method according to the present invention includes the steps of: collecting data as a result of scanning an inspection target in such a manner that a plurality of probes transmit ultrasonic signals to the inspection target and the probes receive reflected ultrasonic signals from the inspection target; rendering a primary image including a contour and an internal side of the inspection target based on the data as the result of scanning by using a sonic speed of the ultrasonic signals transmitted and received by the probes, the sonic speed being set to a predetermined value regardless of a region through which the ultrasonic signals have passed; and evaluating whether an internal flaw is present in the inspection target in the primary image.

To solve the above-described problems and achieve the object, an ultrasonic inspection apparatus includes: a plurality of probes configured to transmit ultrasonic signals to an inspection target via a medium through which the ultrasonic signals propagate, and receive ultrasonic signals reflected from the inspection target; and an arithmetic processing unit configured to collect data as a result of causing the probes to scan the inspection target with the ultrasonic signals, and process the collected the collected data of ultrasonic signals to synthesize the data. The arithmetic processing unit is configured to: collect the data as a result of scanning the inspection target in such a manner that the probes transmit the ultrasonic signals to the inspection target and the probes receive reflected ultrasonic signals from the inspection target; render a primary image including a contour and an internal side of the inspection target based on the data as the result of scanning by using a sonic speed of the ultrasonic signals transmitted and received by the probes, the sonic speed being set to a predetermined value regardless of a region through which the ultrasonic signals have passed; and evaluate whether an internal flaw is present in the inspection target in the primary image.

To solve the above-described problems and achieve the object, a computer program causes a computer to execute the steps of: collecting data as a result of scanning an inspection target in such a manner that a plurality of probes transmit ultrasonic signals to the inspection target and the probes receive reflected ultrasonic signals from the inspection target; rendering a primary image including a contour and an internal side of the inspection target based on the data as the result of scanning by using a sonic speed of the ultrasonic signals transmitted and received by the probes, the sonic speed being set to a predetermined value regardless of a region through which the ultrasonic signals have passed; and evaluating whether an internal flaw is present in the inspection target in the primary image.

Advantageous Effects of Invention

An ultrasonic inspection method, an ultrasonic inspection apparatus, and a computer program further reduce the computational load in the process of detecting flaws in an inspection target during the ultrasonic inspection, advantageously.

DESCRIPTION OF EMBODIMENTS

An ultrasonic inspection method, an ultrasonic inspection apparatus, and a computer program according to some embodiments of the present invention will now be explained in detail with reference to the drawings. These embodiments are, however, not intended to limit the scope of the present invention in any way.

First Embodiment

Figure 1:
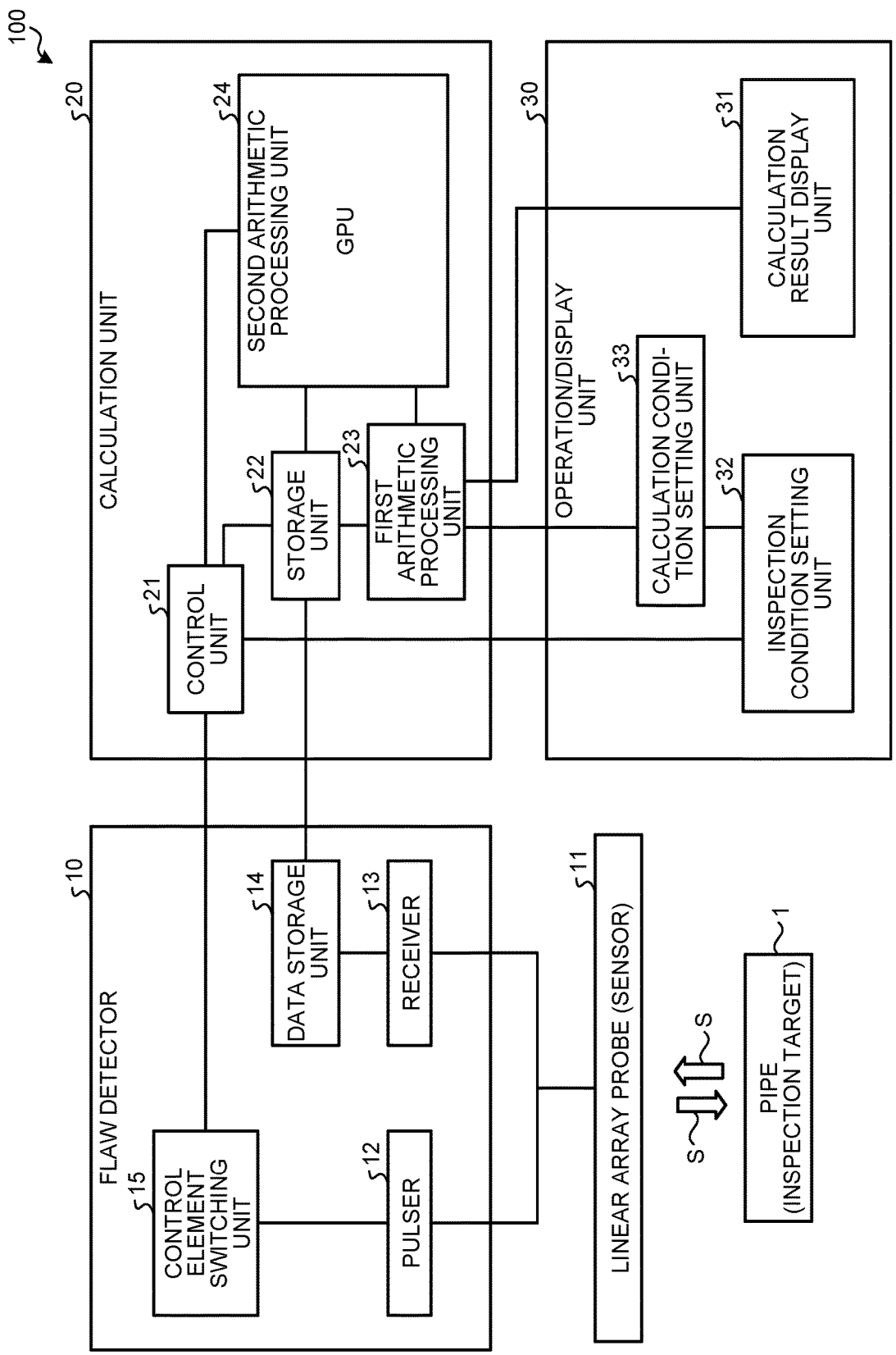
FIG. 1 is a block diagram illustrating a schematic configuration of an ultrasonic inspection apparatus according to an embodiment.
Figure 2:
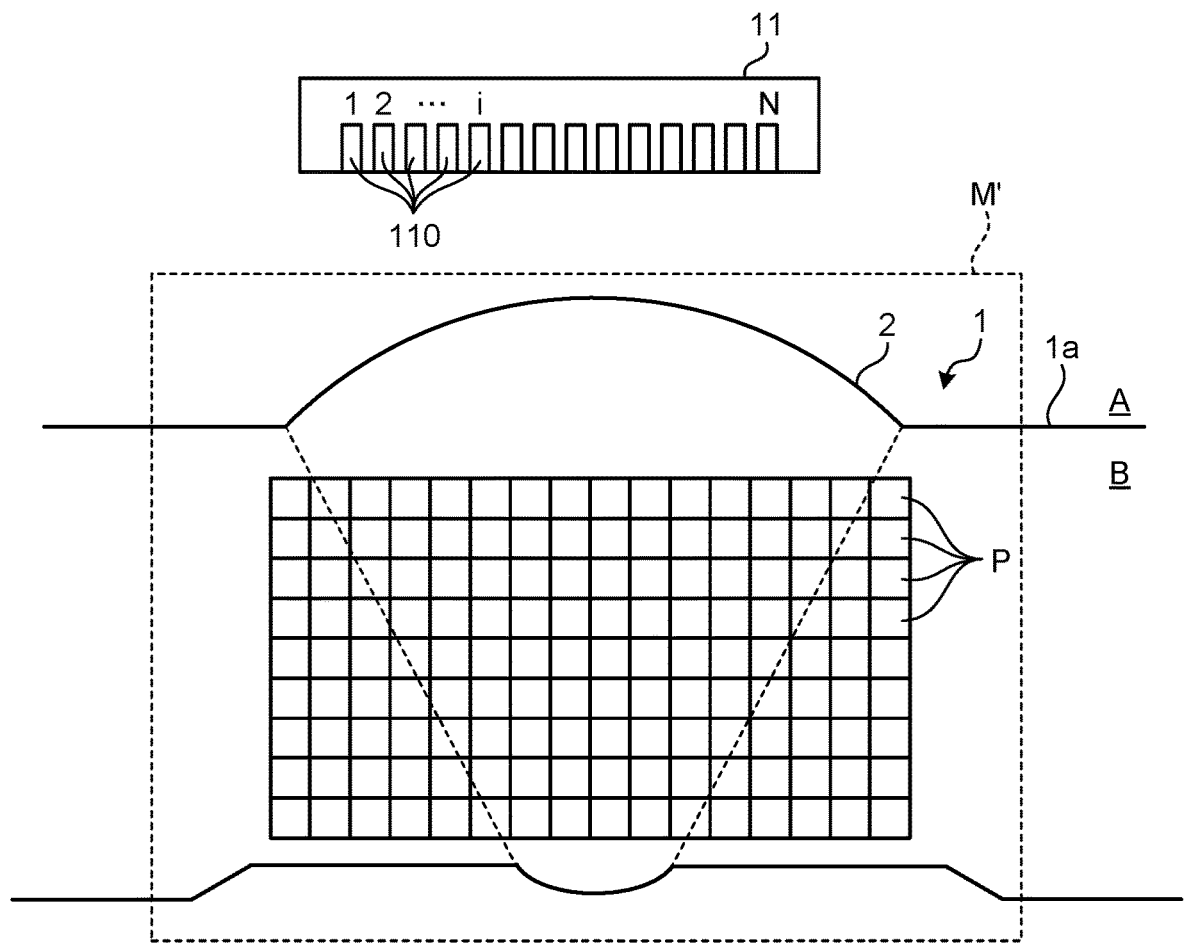
FIG. 2 is a schematic for explaining an example of an inspection target.

FIG. 1 is a block diagram illustrating a schematic configuration of an ultrasonic inspection apparatus according to an embodiment. FIG. 2 is a schematic for explaining an example of an inspection target. In this embodiment, the inspection targets are pipes 1 that are connected to each other by a welded portion 2. The pipes 1 have an outer surface 1a and an inner surface 1b, and the welded portion 2 has an excessive raised portion protruding from the outer surface 1a of the pipe 1. In this embodiment, "the outer surface 1a of the pipe 1" includes the outer surface of the welded portion 2. In the following description, the outer surface 1a and the inner surface 1b of the pipe 1 will be referred to as a "contour" of the pipe 1, as appropriate. If the inspection target does not have the inner surface 1b unlike the pipe 1, the contour means the entire surface within the range to be inspected, or an outer surface and a rear surface that faces the outer surface.

Ultrasonic Inspection Apparatus

An ultrasonic inspection apparatus 100 is an inspection apparatus (flaw detection apparatus) for detecting internal flaws (performs a flaw detection) of an inspection target. In this embodiment, the ultrasonic inspection apparatus 100 detects an internal flaw of the welded portion 2 of the pipe 1. As illustrated in FIG. 1, the ultrasonic inspection apparatus 100 according to this embodiment includes a flaw detector 10, a calculation unit 20, and an operation/display unit 30.

Flaw Detector

The flaw detector 10 includes a linear array probe 11, a pulser (transducer) 12, a receiver 13, a data storage unit 14, and a control element switching unit 15. The linear array probe 11 includes a plurality (N) of probes 110, as illustrated in FIG. 2. In this embodiment, the probes 110 are arranged as a linear array. The configuration of the arrangement of the probes 110 is not limited thereto. In the following description, the i-th probe (where i is an integer between 1 and N) 110 is referred to as a probe 110i. Each of the probes 110 is connected to the pulser 12 serving as a transmitter unit, and the receiver 13 serving as a receiver unit. The space between the probes 110 and the pipe 1 that is the inspection target is filled with a medium A through which an ultrasonic signal S can propagate. Each of the probes 110 transmits the ultrasonic signal S received from the pulser 12 to the welded portion 2 of the pipe 1 that is the inspection target via the medium A, as illustrated by the white arrows in FIG. 1. Each of the probes 110 receives the ultrasonic signal S reflected from the welded portion 2 of the pipe 1 via the medium A, and sends the received ultrasonic signal S to the receiver 13. The ultrasonic signal S received by the receiver 13 is stored in the data storage unit 14. The control element switching unit 15 switches, among the probes 110, the probe 110 for transmitting the ultrasonic signal S from the pulser 12, based on an instruction from a control unit 21 included in the calculation unit 20, which will be described later.

The medium A filling the space between the probe 110 and the pipe 1 that is the inspection target may be any medium capable of propagating ultrasonic waves. The medium A may be, for example, ultrasonic transmission gel or water. When ultrasonic transmission gel is used as the medium A, for example, by pressing a pocket of the ultrasonic transmission gel against the surface of the pipe 1 with appropriate force, the ultrasonic transmission gel deforms according to the shape of the welded portion 2, even if the welded portion 2 has a complex shape. This allows the gap between the pipe 1 and the linear array probe 11 to be filled with the medium A without any space remaining therebetween. For the simplicity of explanation, it is assumed herein that the space between the probes 110 and the pipe 1 is filled with a single type of the medium A. In this manner, the ultrasonic signal S propagates through the medium A, between the linear array probe 11 and the pipe 1.

Calculation Unit

In this embodiment, the calculation unit 20 is an arithmetic processing device provided separately from the flaw detector 10, and connected to the flaw detector 10. The calculation unit 20 is, for example, an externally connected personal computer. The calculation unit 20 may also be provided integrally with the flaw detector 10. The calculation unit 20 includes the control unit 21, a storage unit 22, a first arithmetic processing unit 23, and a second arithmetic processing unit 24.

Control Unit

The control unit 21 is an arithmetic processing device implemented as a central processing unit (CPU), for example. The control unit 21 is connected to the control element switching unit 15 in the flaw detector 10, the storage unit 22, the second arithmetic processing unit 24, and an inspection condition setting unit 32 included in the operation/display unit 30, which will be described later. The control unit 21 loads a computer program stored in the storage unit 22 onto a memory, and executes the instructions included in the computer program. More specifically, the control unit 21 acquires inspection condition information set by a user, from the inspection condition setting unit 32. Based on the acquired inspection condition information, the control unit 21 controls the control element switching unit 15 to cause each of the probes 110 included in the linear array probe 11 to sequentially transmit an ultrasonic signal S to the pipe 1 that is the inspection target, and collects the data related to the ultrasonic signal S reflected from the pipe 1. Once the data collection is completed, the control unit 21 gives an instruction for performing various types of processing on the collected data, to the second arithmetic processing unit 24.

Data Collection Technique

In this embodiment, a collection of data related to the ultrasonic signals S is performed using a technique, what is called a full matrix capture (hereinafter referred to as "FMC"). The FMC is a data collection technique for causing all of the probes 110 to execute a sequence in which the ultrasonic signal S output from one of the probes 110 and reflected from the inspection target is received by all of the probes 110. More specifically, the control unit 21 causes one of the probes 110 included in the linear array probe 11 to transmit the ultrasonic signal S to the pipe 1. The ultrasonic signal S reflected from the pipe 1 is then received by all of the probes 110, and stored in the data storage unit 14 via the receiver 13. Denoting the number of the probes 110 included in the linear array probe 11 as N, N pieces of data are stored, for the ultrasonic signal S reflected from the pipe 1, in the data storage unit 14. In the same manner, the control unit 21 then causes another probe 110 that is different from the one having output the ultrasonic signal S at the previous timing, to transmit an ultrasonic signal S. As a result, N pieces of data are newly stored in the data storage unit 14 for the ultrasonic signal S reflected from the pipe 1. This process is repeated until all of the N probes 110 transmit ultrasonic signals S. As a result, N×N matrix of data will be stored in the data storage unit 14, for the ultrasonic signals S reflected from the pipe 1. This N×N matrix of data related to the ultrasonic signals S corresponds to the data acquired by scanning the pipe 1 with the ultrasonic signals S.

Storage Unit

The storage unit 22 stores therein data (computer programs) required for various processes executed by the ultrasonic inspection apparatus 100. The storage unit 22 is, for example, a semiconductor memory element such as a random-access memory (RAM), a read-only memory (ROM), a flash memory, or a storage device such as a hard disk or an optical disc. The storage unit 22 is connected to the data storage unit 14 in the flaw detector 10, and to the first arithmetic processing unit 23 and the second arithmetic processing unit 24. The storage unit 22 receives the N×N pieces of data related to the ultrasonic signals S from the data storage unit 14, the data having been collected with the FMC described above, and stores therein the received data. The storage unit 22 transmits the data related to the ultrasonic signals S stored therein to the first arithmetic processing unit 23 and the second arithmetic processing unit 24, upon receiving a request therefrom.

In this embodiment, the storage unit 22 also stores therein a predetermined value V of sonic speed of the ultrasonic signal S to be used in an ultrasonic inspection method, which will be described later. A plurality of patterns are stored as the predetermined value V. The predetermined value V is, for example, the speed of sound through the medium A filled between the probe 110 and the pipe 1, the speed of sound through the inside of the pipe 1, or any speed selected between these speeds of sound, and is set in advance by a user. The predetermined value V does not have to be stored as a plurality of patterns in advance. In other words, the predetermined value V may be any value entered by the user via the operation/display unit 30, which will be described later, at the timing when ultrasonic inspection is to be carried out.

First Arithmetic Processing Unit

The first arithmetic processing unit 23 is an arithmetic processing device implemented as a CPU, for example. The first arithmetic processing unit 23 is connected to the storage unit 22, the second arithmetic processing unit 24, a calculation condition setting unit 33, and a calculation result display unit 31 included in the operation/display unit 30. The first arithmetic processing unit 23 loads a computer program stored in the storage unit 22 onto the memory and executes the instructions included in the computer program. The first arithmetic processing unit 23 acquires information of calculation conditions that are set based on the inspection conditions, from the calculation condition setting unit 33. The first arithmetic processing unit 23 sends the acquired calculation conditions to the second arithmetic processing unit 24. The first arithmetic processing unit 23 also sends the result calculated by the second arithmetic processing unit 24 to the calculation result display unit 31.

Second Arithmetic Processing Unit

The second arithmetic processing unit 24 is an arithmetic processing device implemented as a graphics processing unit (GPU). The second arithmetic processing unit 24 is connected to the control unit 21, the storage unit 22, and the first arithmetic processing unit 23. In this embodiment, the second arithmetic processing unit 24 is what is called a GPU, and also performs processing other than image rendering processing using the GPU. In this manner, it is possible to increase the calculation speed. At least one GPU is required, but a plurality of GPUs may also be used in parallel. The second arithmetic processing unit 24 receives the N×N pieces of data related to the ultrasonic signals S, the data having been collected with the FMC described above, from the storage unit 22. The second arithmetic processing unit 24 processes and synthesizes the N×N pieces of data related to the ultrasonic signals S, i.e., the data as the result of scanning the pipe 1, based on an instruction received from the control unit 21 and the calculation condition information received from the first arithmetic processing unit 23, using a total focusing method (hereinafter referred to as "TFM"), and prepares a calculation result in which the internal side of the pipe 1 is rendered based on the synthesized results. The TFM includes various methods for analyzing data related to the ultrasonic signals S, the data having been collected with the FMC, and synthesizing the ultrasonic signals S.

As illustrated in FIG. 2, the second arithmetic processing unit 24 performs the process of synthesizing the amplitudes of the N×N ultrasonic signals S collected with the FMC, using the TFM described above, for each pixel P in a calculation region that includes a plurality of pixels P and is partitioned in a grid-like pattern. In this embodiment, the pixels P are partitioned into a grid-like pattern along a direction e1 that is the direction in which the outer surface 1$a$ of the pipe 1 that is the inspection target extends (horizontal direction in FIG. 2), and a direction e2 orthogonal to the direction in which the outer surface 1$a$ of the pipe 1 extends (the vertical direction in FIG. 2). The pixels P illustrated in FIG. 2 represent a part of the calculation region. In practice, not only the internal region of the pipe 1, but also the region between the linear array probe 11 and the outer surface 1$a$ of the pipe 1, as well as the region including the inner surface 1$b$ of the pipe 1, are calculation regions similarly partitioned with the pixels P. The second arithmetic processing unit 24 sends the created calculation result to the first arithmetic processing unit 23.

Operation/Display Unit

The operation/display unit 30 is an apparatus having both of a display function for displaying an inspection result and an input operation function that serves as a user interface. The operation/display unit 30 may be, for example, a touch panel display. In this embodiment, the operation/display unit 30 is provided separately from the flaw detector 10, and is connected to the calculation unit 20. The operation/display unit 30 may also be integrated with the flaw detector 10. The operation/display unit 30 is not limited to a touch panel display, but a display function for displaying an inspection result and an operation function serving as a user interface may be installed in units separated from each other.

The operation/display unit 30 includes the calculation result display unit 31, the inspection condition setting unit 32, and the calculation condition setting unit 33, as illustrated in FIG. 1. The calculation result display unit 31 is connected to the first arithmetic processing unit 23 in the calculation unit 20. The calculation result display unit 31 displays a result of the calculation performed by the second arithmetic processing unit 24 and received from the first arithmetic processing unit 23, i.e., a result of rendering the internal side of the pipe 1, to the user.

The inspection condition setting unit 32 is a user interface on which a user sets inspection conditions. The inspection conditions include information such as a configuration in which the probes 110 are arranged in the linear array probe 11, and the type of the medium A. The inspection conditions also include information such as that indicating that the welded portion 2 of the pipe 1 is an inspection target, the size (wall thickness) of the pipe 1, and the type of material of which the pipe 1 is made.

The calculation condition setting unit 33 sets calculation conditions based on the inspection condition entered by a user, and sends the calculation condition to the first arithmetic processing unit 23 in the calculation unit 20. The calculation conditions are various conditions required in performing the calculation in the second arithmetic processing unit 24, based on the information of the inspection conditions described above. The calculation conditions include, for example, information on the calculation region a part of which is schematically illustrated as a plurality of pixels P in FIG. 2.

Ultrasonic Inspection Method

Figure 3:
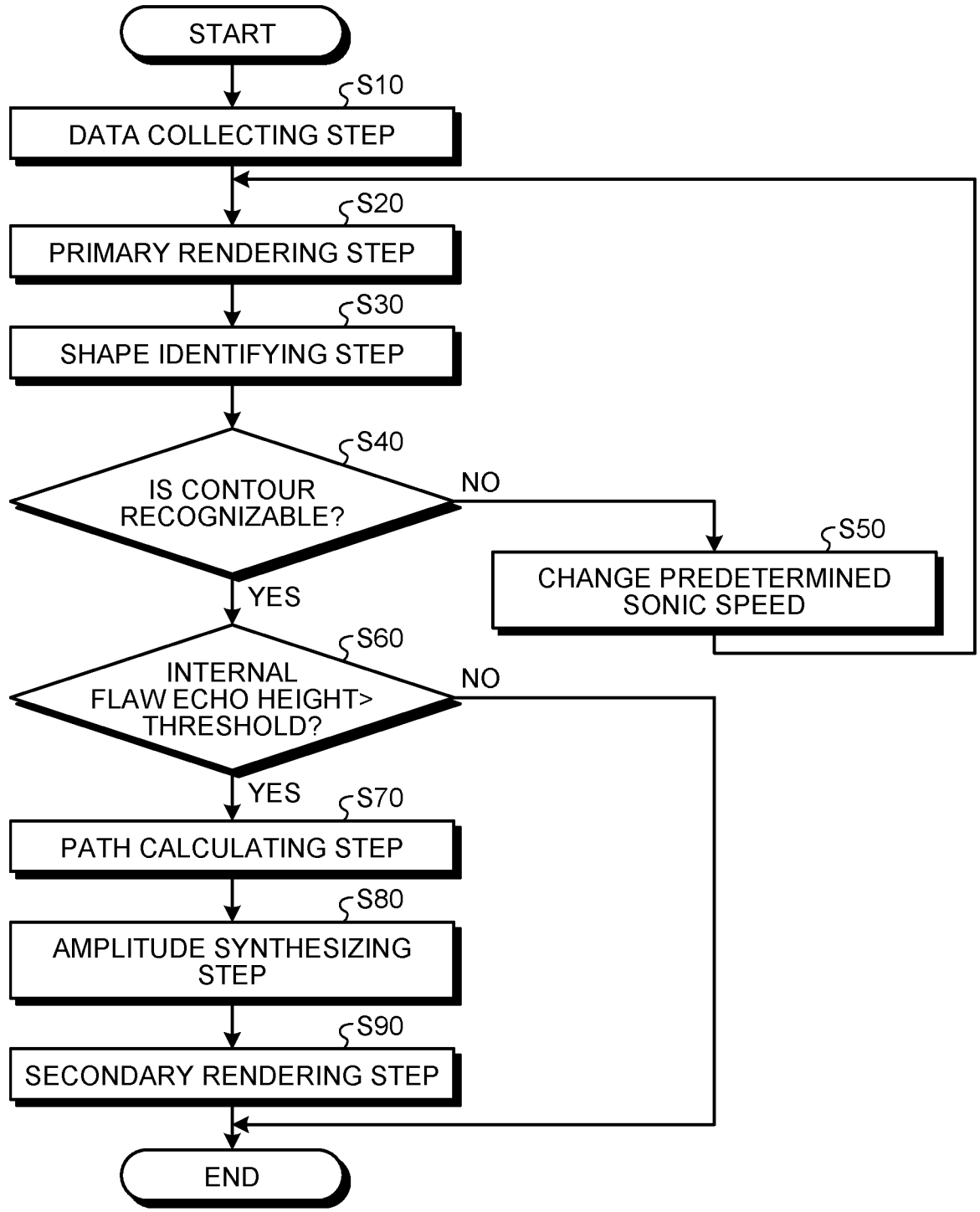
FIG. 3 is a flowchart illustrating the sequence of a process of an ultrasonic inspection method.

The sequence of a process of the ultrasonic inspection method according to the embodiment will now be explained. FIG. 3 is a flowchart illustrating the sequence of the process of the ultrasonic inspection method. The sequence of the process illustrated in FIG. 3 is performed by causing the control unit 21, the first arithmetic processing unit 23, and the second arithmetic processing unit 24 in the calculation unit 20 to execute a computer program stored in the storage unit 22. The sequence of the process illustrated in FIG. 3 is performed with the flaw detector 10 positioned in place on the welded portion of the pipe 1.

The calculation unit 20 causes the control unit 21 to execute a data collecting step (data collecting process) as Step S10. The data collecting step is a step for scanning the pipe 1 that is an inspection target with ultrasonic signals, using the FMC described above. As mentioned earlier, the control unit 21 executes a sequence of receiving, with all of the probes 110, an ultrasonic signal S output from one of the probes 110 and reflected from the inspection target, for all of the probes 110. In this manner, the data storage unit 14 comes to store therein N×N matrix data for the ultrasonic signals reflected from the pipe 1, i.e., the data as the result of scanning the pipe 1. Once the scan data for the pipe 1 is collected, the calculation unit 20 synthesizes the data by following the process described below. The process below is executed by the second arithmetic processing unit 24 in response to an instruction from the control unit 21.

The calculation unit 20 causes the second arithmetic processing unit 24 to execute a primary rendering step as Step S20. The primary rendering step is a step for rendering a primary image M including the contour and the internal side of the pipe 1, based on the scanned data acquired by setting the sonic speed of the ultrasonic signals S transmitted and received by the probes 110 at the data collecting step to the predetermined value V, the sonic speed being set regardless of the region where the ultrasonic signals S have passed.

Figure 4:
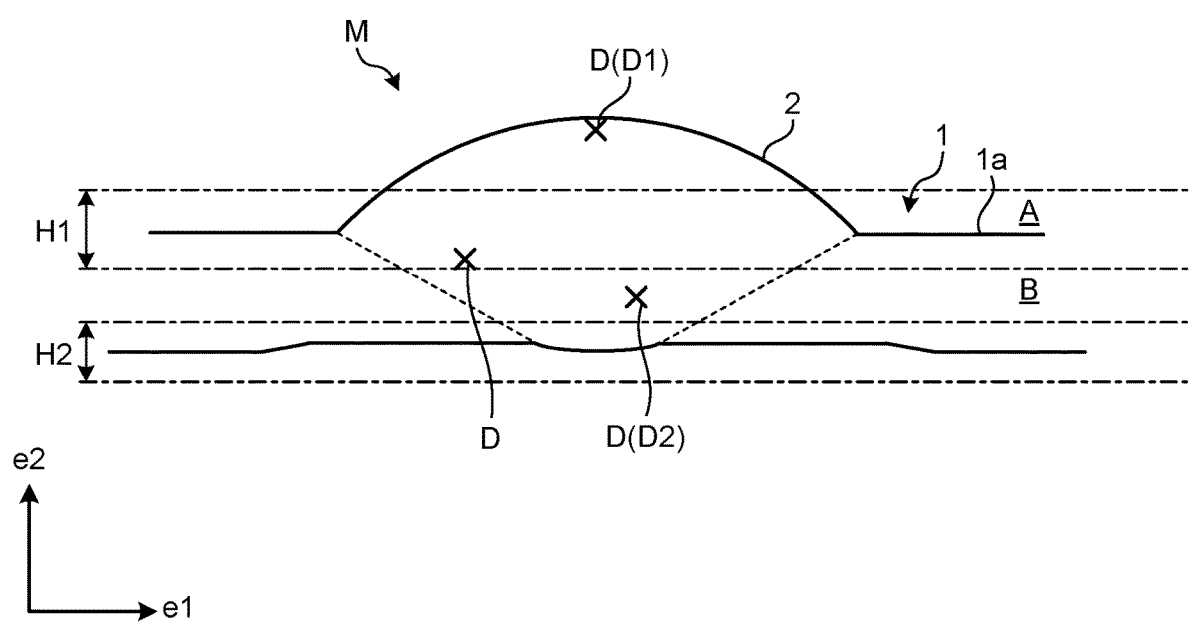
FIG. 4 is a schematic for explaining an example of a primary image created at a primary rendering step.

FIG. 4 is a schematic for explaining an example of the primary image created at the primary rendering step. The primary image M illustrated in FIG. 4 may be rendered by synthesizing the amplitudes of the ultrasonic signals S collected using the FMC at the data collecting step, in such a manner that the timing of surges of the amplitudes and the respective positions of the pixels P are matched, calculating intensities associated with the synthesized amplitudes, and mapping the intensities to the calculation region. At this time, because the amplitude of the ultrasonic signal S also surges when the ultrasonic signal S is reflected from the internal flaw of the pipe 1, an internal flaw D is also rendered at the same time, as illustrated in FIG. 4.

The primary rendering step can be performed using the well-known TFM technique. The primary rendering step may also be performed using a technique other than the TFM technique. At the primary rendering step, it is also possible to use a technique for synthesizing received echoes in a frequency domain, for example, using the inverse scattering imaging method (ISIM). In addition to the waveform re-synthesizing process that uses the FMC and the TFM, a phased array and the vertical UT techniques may also be used.

At this time, at the primary rendering step, the primary image M is rendered for the ultrasonic signals S transmitted and received by the probes 110, with the sonic speed set to the predetermined value V, regardless of the region where the ultrasonic signals S have passed. The "sonic speed set to a predetermined value V regardless of the region where the ultrasonic signals S have passed" means that the predetermined value V is assumed to be the sonic speed regardless of which one of the regions of the medium A and the internal side of the pipe 1 have passed the ultrasonic signals S, transmitted and received by the probe 110. The predetermined value V is selected from the patterns stored in the storage unit 22. In this embodiment, the predetermined value V is set to the sonic speed in the medium A filled between the probes 110 and the pipe 1. The predetermined value V may be set to another speed, such as the speed of sound inside the pipe 1. A user may select the predetermined value V from the patterns via the inspection condition setting unit 32, or may also enter a value.

In this embodiment, because a constant predetermined value V is set as the sonic speed of the ultrasonic signal S, the shape of the pipe 1 in the primary image M, as illustrated in FIG. 4, will be different from the actual shape (illustrated in FIG. 2). In other words, the actual sonic speed of the ultrasonic signals S having passed through the internal side of the solid pipe 1 (hereinafter referred to as a "medium B" as appropriate), is lower than that through the medium A filled between the linear array probe 11 and the pipe 1. Therefore, if the primary image M is rendered with the predetermined value V set according to the sonic speed through the medium A, a calculation time required for the ultrasonic signal S to pass through the medium B will be shorter than the actual time. As a result, as illustrated in FIG. 4, the internal side of pipe 1, i.e., the section between the outer surface 1*a* and the inner surface 1*b*, is rendered smaller than that in the actual shape in the vertical direction.

The second arithmetic processing unit 24 then performs a shape identifying step as Step S30. The shape identifying step is a step for identifying the contour, i.e., the outer surface 1*a* and the inner surface 1*b*, of the pipe 1 in the primary image M. Specifically, in the primary image M, the pixel P with the highest pixel intensity is extracted from the pixels P in a row in the direction e2, and the extracted pixel P is identified as the position of the outer surface 1*a* or the inner surface 1b of the pipe 1. In other words, the outer surface 1a and the inner surface 1b can be easily identified by using the pixel intensities as an indicator of the intensities of the ultrasonic signals S reflected from the outer surface 1a or the inner surface 1b. The outer surface 1a and the inner surface 1b, and the internal flaw D, and the outer surface 1a and the inner surface 1b may be distinguished from each other based on the distances between the probes 110 and the pixel P with the highest pixel intensity.

As Step S40, the second arithmetic processing unit 24 then determines whether the contour of the pipe 1 can be recognized in the primary image M. In other words, it is determined whether the positions of the outer surface 1a and the inner surface 1b in the primary image M, the positions identified at the shape identifying step at Step S30, are within a designed range. The "designed range" herein includes a range H1 where the outer surface 1a is predicted in advance to be positioned, and a range H2 in which the inner surface 1b is predicted in advance to be positioned, and these designed ranges can be set based on the distance between the linear array probe 11 (probes 110) and the pipe 1, the wall thickness of the pipe 1, and the predetermined value V. Therefore, at Step S40, the second arithmetic processing unit 24 determines that the contour can be recognized when the outer surface 1a is positioned within the range H1 and the inner surface 1b is positioned within the range H2. If the outer surface 1a is not positioned within the range H1 or the inner surface 1b is not positioned within the range H2, the second arithmetic processing unit 24 determines that the contour cannot be recognized.

If the second arithmetic processing unit 24 determines that the contour of the pipe 1 cannot be recognized in the primary image M (No at Step S40), the predetermined value V of the sonic speed is changed as Step S50. At this time, the predetermined value V may be changed by automatically selecting from the patterns of predetermined V1 stored in the storage unit 22 in advance, or it may be selected by a user via the inspection condition setting unit 32. The user may also set any value. Thereafter, the second arithmetic processing unit 24 repeats the process of Step S20 and the subsequent step(s) until it is determined that the contour of the pipe 1 can be recognized at Step S40.

If the second arithmetic processing unit 24 determines that the contour of the pipe 1 can be recognized (Yes at Step S40), the process goes to Step S60 to evaluate whether the pipe 1 includes any internal flaw in the primary image M. More specifically, as illustrated in FIG. 3, it is determined whether an internal flaw echo height of the pipe 1 is equal to or higher than a threshold. The threshold is set by the user in advance, based on past inspection results, as a value by which an echo height higher than that is determined as an internal flaw. At this time, the internal flaw echo height is the amplitude (dB) of the synthesized ultrasonic signal at the position corresponding to the pixel P, being synthesized when the primary image M is rendered. The amplitudes at the pixels P identified as the outer surface 1a and the inner surface 1b are excluded from this determination. At Step S60, if this determination is completed for all of the pixels P in the primary image M, and if the echo height (amplitude) is higher than the threshold, it is determined that there is an internal flaw D at that position. In this manner, an evaluation as to whether the pipe 1 includes any internal flaw D is made.

If the second arithmetic processing unit 24 determines that the internal flaw echo height is lower than the threshold (No at Step S60), this routine is ended. In other words, if the echo height at each of the pixels P in the primary image M is sufficiently lower than the level to be recognized as an internal flaw D, this routine is ended. By contrast, if the second arithmetic processing unit 24 determines that the internal flaw echo height is higher than the threshold (Yes at Step S60), the process is shifted to Step S70 to Step S90.

The second arithmetic processing unit 24 executes a path calculating step as Step S70. The path calculating step is a step for calculating a position, among those on the outer surface 1a identified at the shape identifying step, at which the propagation time of the ultrasonic signal S from the probe 110 to a pixel P is the smallest, and establishing the path passing through the calculated position of the surface shape as the propagation path of the ultrasonic signal S.

Figure 5:
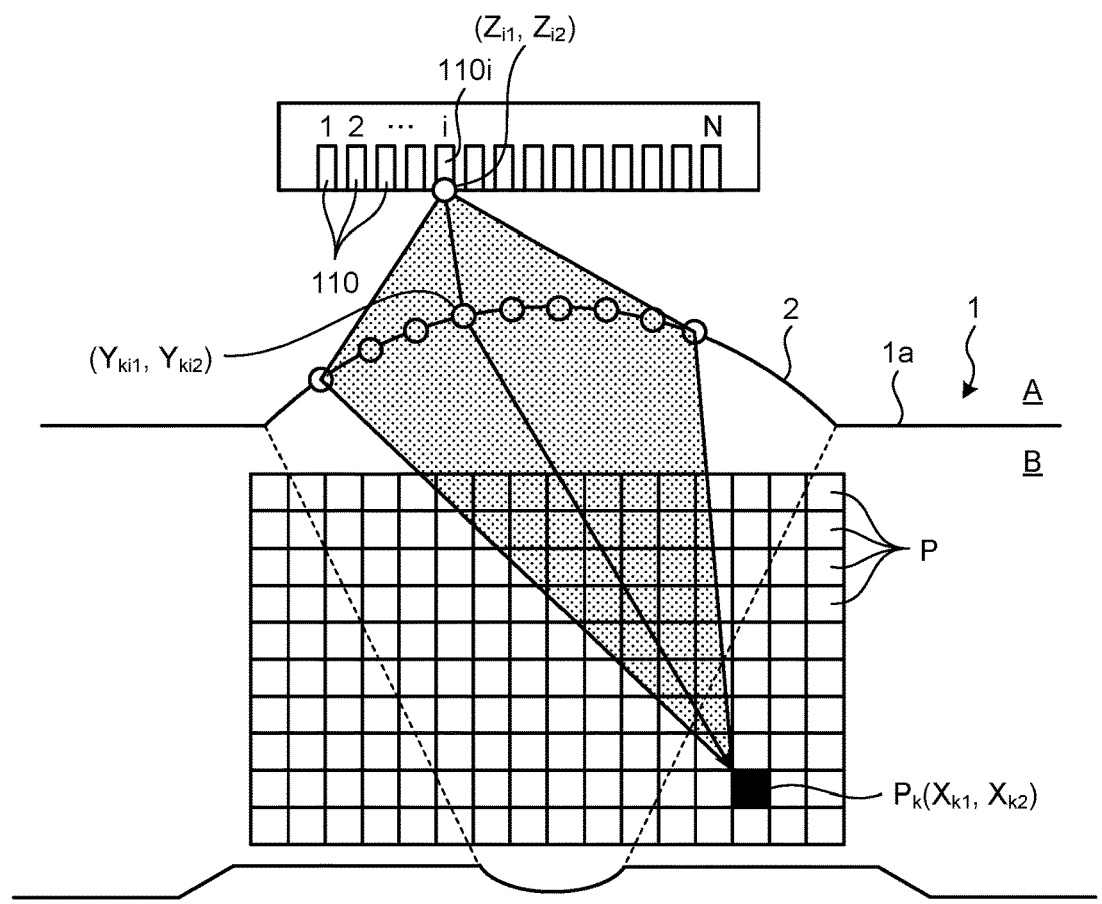
FIG. 5 illustrates an example of a path along which an ultrasonic signal from a probe propagates to a pixel.
Figure 5:
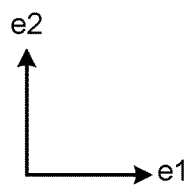
Figure 6:
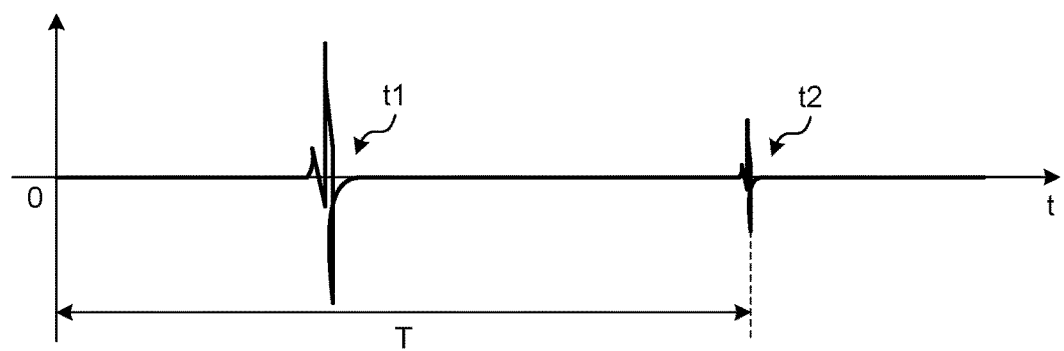
FIG. 6 is a schematic for explaining an example of the waveform of the ultrasonic signal traveling from the probe to reach a pixel.

Referring to FIGS. 5 and 6, the path calculating step will now be explained in detail. FIG. 5 is a schematic for explaining an example of a propagation path by which an ultrasonic signal from a probe arrives at a pixel, and FIG. 6 is a schematic for explaining an example of the waveform of the ultrasonic signal output from the probe and arriving at the pixel. In FIG. 5, denoting the coordinate axes as the directions e1 and e2, the coordinates of an (i-th) probe 110$i$ are denoted as $(Z_{i1}, Z_{i2})$, the coordinates of a pixel $P_k$ are denoted as $(X_{k1}, X_{k2})$, and the coordinates of the surface of the pipe 1 through which an ultrasonic signal S has passed are denoted as $(Y_{ki1}, Y_{ki2})$. FIG. 6 illustrates the waveform of the ultrasonic signal S when there is an internal flaw D at the position of the pixel $P_k$.

As illustrated in FIGS. 5 and 6, the ultrasonic signal S output from the probe 110$i$ is refracted on the outer surface 1a of the pipe 1, the outer surface being the boundary between medium A and the medium B (at time t1 in FIG. 6), goes into the welded portion 2 (the medium B), and reaches the position corresponding to the pixel $P_k$ (at time t2 in FIG. 6). A propagation time T required for the ultrasonic signal S from the probe 110$i$ to reach the position corresponding to the pixel $P_k$ can be calculated by Equation (1) below. In Equation (1), "Ca" denotes the sonic speed in the medium A, and "Cb" denotes the sonic speed in the medium B (the pipe 1).

$$T = \mathrm{Sqrt}((Z_{i1}-Y_{ki1})^2 + (Z_{i2}-Y_{ki2})^2)/Ca + \mathrm{Sqrt}((Y_{ki1}-X_{k1})^2 + (Y_{ki2}-X_{k2})^2)/Cb \qquad (1)$$

Because the coordinates of the probe 110$i$ $(Z_{i1}, Z_{i2})$ and the coordinates of the pixel $P_k$ $(X_{k1}, X_{k2})$ are values determined in advance, the only unknown in Equation (1) is the coordinates of the surface of the pipe 1 $(Y_{ki1}, Y_{ki2})$. At this time, the ultrasonic signal S can be considered as having taken the shortest propagation path from the probe 110$i$ to the position corresponding to the pixel $P_k$. This is based on the Fermat's principle. Therefore, among the coordinates of the surface of the pipe 1 identified at the shape identifying step, it is possible to establish the coordinates where the shortest propagation time T is calculated by Equation (1) as the position at which the ultrasonic signal S has gone into the pipe 1 (the medium B) from the medium A. As a result, because all of the coordinates $(Z_{i1}, Z_{i2})$ of the probe 110$i$, the coordinates $(X_{k1}, X_{k2})$ of the pixel $P_k$, and the coordinates $(Y_{ki1}, Y_{ki2})$ of the surface of the pipe 1 are determined, it becomes possible to determine the transmission path of the ultrasonic signal S. The second arithmetic processing unit 24 calculates all of the propagation paths each taken by the ultrasonic signal S emitted from each of the probes 110 to arrive at each of the pixels P included in the calculation region, based on the propagation path determining sequence described above.

The second arithmetic processing unit 24 performs an amplitude synthesizing step as Step S80. The amplitude synthesizing step is a step for synthesizing the amplitude, for the data of the ultrasonic signals S collected at the data collecting step, by matching the timing and the pixel where the amplitude has surged, based on the propagation path calculated at the path calculating step. In other words, once the propagation path of the ultrasonic signal S to each of the pixels P is determined at the path calculating step, the propagation time T required for the ultrasonic signal S to propagate to the pixel P can also be determined based on Equation (1). Therefore, by matching the timing of a surge in the amplitude with the propagation time T calculated by Equation (1), in the data corresponding to each one of ultrasonic signals S and collected using the FMC at the data collecting step (time t2 in the example illustrated in FIG. 6), it becomes possible to determine the position of the pixel P where the ultrasonic signal S has reflected. Therefore, for all of the data of the ultrasonic signals S collected with the FMC at the data collecting step, the second arithmetic processing unit 24 synthesizes the amplitude of the ultrasonic signal S with a matching propagation time T, in the corresponding pixel P.

The second arithmetic processing unit 24 performs a secondary rendering step as Step S90. The secondary rendering step is a step for calculating a calculation result that is rendering of the internal side of the pipe 1, by calculating the intensities associated with the amplitudes synthesized at the amplitude synthesizing step, and mapping the intensities to the calculation region. In other words, for the scan data collected at the data collecting step, the ultrasonic signals S are synthesized using the sonic speeds corresponding to the respective regions through which the ultrasonic signals S have passed (the media A and B), to render a secondary image M' for close inspection (e.g., an image depicting the range inside the dashed lines in FIG. 2). Therefore, in the secondary image M', the contour and the internal side of the pipe 1 are rendered at an accuracy closer to the real object, compared with that in the primary image M. The second arithmetic processing unit 24 sends the secondary image M' depicting the internal side of the pipe 1 to the calculation result display unit 31 included in the operation/display unit 30. This allows a user to determine the presence and the position of an internal flaw more accurately, by referring to the calculation result displayed on the calculation result display unit 31. In the secondary image M', the presence of the internal flaw may be determined based on the echo height (dB) of a synthetic wave corresponding to each of the pixels P, in the same manner as at Step S90.

The processing from Step S70 to Step S90 is not limited to the method described above, as long as the data synthesizing process is performed using the sonic speed according to the region where the ultrasonic signals S have passed. For example, the inverse scattering imaging method (ISIM) may be used to synthesize the received echoes in the frequency domain. In addition, without limitation to the waveform synthesizing process using the FMC and the TFC, a phased array technique and a vertical UT technique may also be used.

As described above, the ultrasonic inspection method according to the first embodiment includes Step S1 of collecting data as a result of scanning the pipe 1 by transmitting ultrasonic signals S from the probes 110 to the pipe 1 (inspection target) and receiving the reflected ultrasonic signal S from the pipe 1 with the probes 110; the step of rendering a primary image M including the contour and the internal side of the pipe 1 based on the scanned data by setting the sonic speed to a predetermined value V regardless of the region where the ultrasonic signals S transmitted and received by the probes 110 have passed; and the step of evaluating the presence of an internal flaw D in the pipe 1, in the primary image M.

With this configuration, because the sonic speed is handled as a predetermined value V that is a constant value, regardless of the regions through which the ultrasonic signals S have passed, it is possible to render a primary image M without performing complex calculation correspondingly to the regions through which the ultrasonic signals S have passed. The presence of an internal flaws D is then evaluated in the primary image M rendered with a simple calculation. In other words, as a starting point, the possibility of whether any internal flaw D is present can be evaluated appropriately. As a result, the presence of an internal flaw D can be evaluated with a simple calculating process, compared with when a complex calculating process is used in rendering a highly accurate scan image of the inspected region in order to evaluate the position and the size of the internal flaw D highly accurately. Therefore, it is possible to further reduce the computational load in the process of inspecting an inspection target in the ultrasonic inspection.

In this embodiment, the predetermined value V is one sonic value, but it is not limited thereto. As the predetermined value V that is set regardless of the region through which the ultrasonic signals have passed, it is also possible to use any combination of a plurality of sonic speeds having been set in advance, that is, to use a different value set for each range having been set in advance as the predetermined value. For example, it is possible to establish ranges by assuming the surface topography, physical properties of the medium A, and the like, and to set separate sonic speeds for the respective ranges. In this manner, there will be some parts where the assumed boundary surface is offset from the actual boundary surface, the portion corresponding to the medium A is rendered using a sonic speed appropriate for the pipe 1, and the part corresponding to the pipe 1 is rendered using a sonic speed appropriate for the medium A. However, in this manner, a balanced primary image M based on the assumed contour can be rendered, using simple calculation based on preset values.

The ultrasonic inspection method according to the first embodiment also includes, prior to the step of evaluating whether there is an internal flaw D, Step S40 of determining whether the contour can be recognized in the primary image M based on the position of the contour, and the process of the step of rendering the primary image M and the subsequent step(s) is repeated until it is determined that the contour can be recognized with the predetermined value V of sonic speed changed. With this configuration, the pipe 1 can be rendered appropriately in the primary image M that is rendered using the predetermined value V as the sonic speed.

The ultrasonic inspection method also includes, when it is evaluated that the pipe 1 includes an internal flaw D in the primary image M, Steps S70 to S90 of rendering a secondary image M' including the contour and the internal side of the pipe 1 by setting the sonic speed to the speed according to each region through which the ultrasonic signals S have passed. With this configuration, it becomes possible to make detailed evaluation of the position and the size of an internal flaw D, when there is any, using a secondary image M' rendered using appropriate sonic speeds matching the regions where the ultrasonic signals have passed.

In the first embodiment, the process from Step S10 to Step S90 is executed as a series of steps, but the embodiment is not limited thereto. Only the process of collecting data at Step S10 may be performed on an inspection site, and Steps S20 to S90 may be performed later under a direction of the user.

In the first embodiment, at Step S60 in FIG. 3, the presence of an internal flaw D is evaluated based on whether the internal flaw echo height at each pixel P is higher than the threshold. However, Step S60 may also be made under the discretion of the user. In other words, the presence of an internal flaw D may be determined by displaying the primary image M on the operation/display unit 30, and allowing the user to visually check the points where reflection echo height is high, in the displayed primary image M. In this case, the process from Step S70 to Step S90 may be performed, when the user determines that an internal flaw D is present, under an instruction given from the user via the operation/display unit 30, for example.

In the first embodiment, at Step S40 in FIG. 3, the second arithmetic processing unit 24 determines whether the contour can be recognized. However, Step S40 may be made under the discretion of the user. In other words, it is possible to determine whether the contour can be recognized by displaying the primary image M on the operation/display unit 30, and allowing the user to visually check the contour in the displayed primary image M. In this case, the process from Step S50 to Step S90 may be performed under an instruction given from the user via the operation/display unit 30, for example.

Step S40 of determining whether the contour can be recognized may be made based on a database where data of inspection targets are accumulated, after updating the range where the contour can be recognized by machine learning. In other words, the shape of the welded portion 2 of the pipe 1 may differ depending on persons who create the welded portion 2. For example, the position of the outer surface 1a in the welded portion 2 may differ from person to person, because the welded portion 2 may become larger or smaller depending on the person who have done the welding. Therefore, every time an ultrasonic inspection according to the embodiment is carried out, data storing therein the position of the outer surface 1a in a manner mapped to the person who has done the welding is accumulated in a database. The range H1 in which the outer surface 1a is positioned may then be updated for each person who has done the welding, based on the database, and a determination as to whether the outer surface 1a is within the range H1 may then be made. In this manner, it becomes possible to determine whether the outer surface 1a is rendered at an appropriate position more appropriately.

Second Embodiment

An ultrasonic inspection method, an ultrasonic inspection apparatus, and a control program according to a second embodiment will now be explained. The ultrasonic inspection method according the second embodiment is different from that in the first embodiment in that the processing of the data collecting step at Step S10 in FIG. 3 is different. Therefore, in terms of the configuration, the ultrasonic inspection apparatus according to the second embodiment is not different from the ultrasonic inspection apparatus according to the first embodiment illustrated in FIG. 1, so explanation thereof is omitted. The ultrasonic inspection method according to the second embodiment is executed by the calculation unit 20, based on a computer program stored in the storage unit 22.

Figure 7:
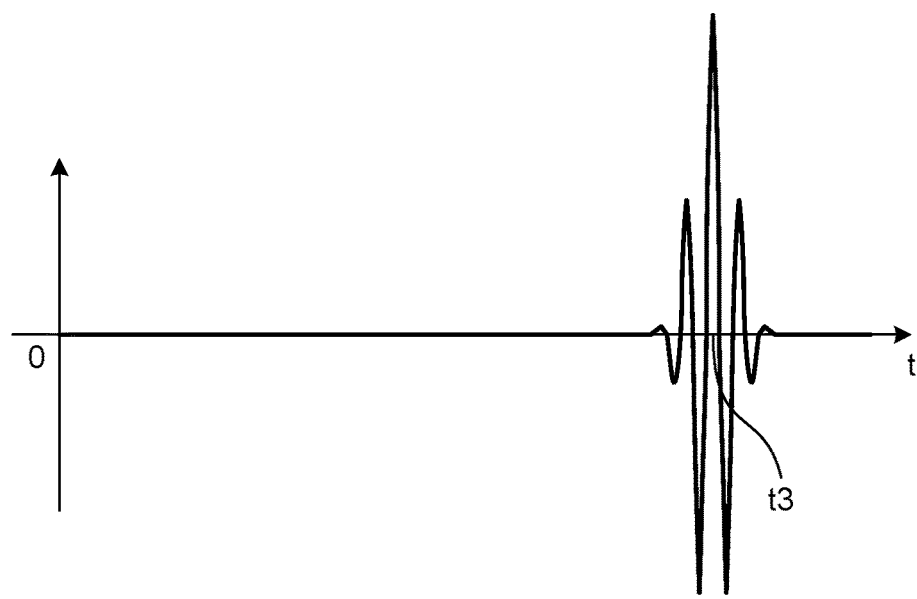
FIG. 7 is a schematic for explaining an example of a change in the amplitude of the ultrasonic signal, the change being caused by an internal flaw of a pipe.

FIG. 7 is a schematic for explaining an example of a change in the amplitude of an ultrasonic signal, the change being caused by an internal flaw of a pipe. It is assumed herein that at time t3, the amplitude of a composite wave of the ultrasonic signal S has increased due to the presence of the internal flaw. At this time, a plurality of echoes are observed, as compared with the case at the time t2 in FIG. 6, for example. This is because, depending on the damping characteristics of the probe 110, the transmitted ultrasonic signal S may become relatively strong not only in the first wave but also in the second and the third waves. Therefore, when a plurality of echoes appear, if the internal flaw D (the internal flaw D1 illustrated in FIG. 4) and the contour, that is, the outer surface 1a or the inner surface 1b, are close to each other, it may not be possible to distinguish the internal flaw D from the contour accurately.

Therefore, in the second embodiment, scan data is collected using the following method at the data collecting step at Step S10 illustrated in FIG. 3. Specifically, before causing each of the probes 110 to transmit the ultrasonic signal S, the control unit 21 sets a pulse width of the voltage applied to the transducer of the probe 110, that is, the pulser 12, to a width by which an ultrasonic signal S at the highest frequency within the effective frequency band of the probe is transmitted.

Figure 8:
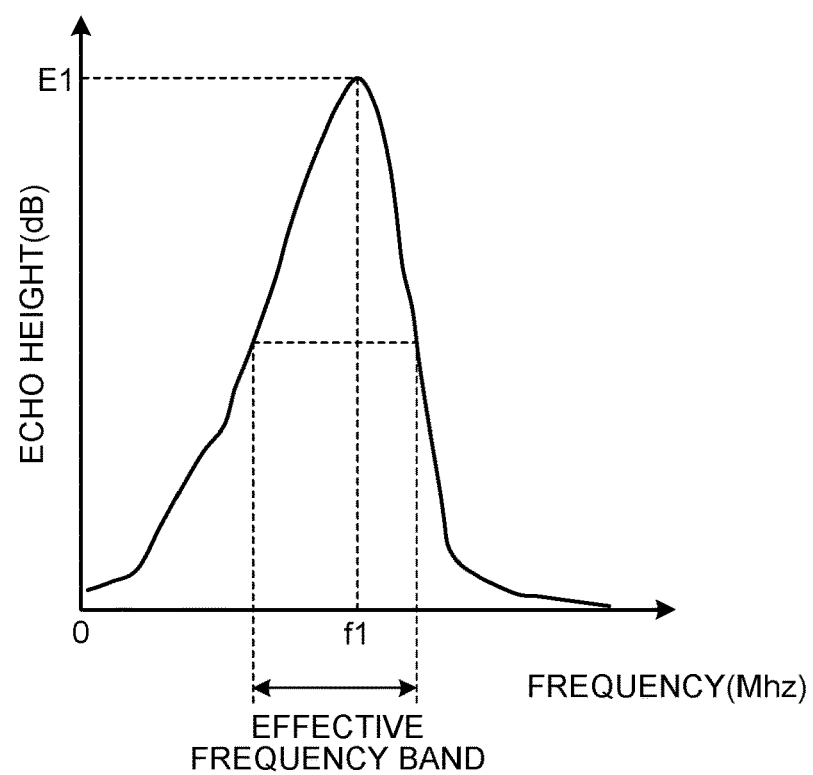
FIG. 8 is a schematic for explaining an example of a frequency band of an ultrasonic signal transmitted from the probe.

More detailed explanations will be provided with reference to FIG. 8. FIG. 8 is a schematic for explaining an example of a frequency band of an ultrasonic signal transmitted from the probe. As illustrated in FIG. 8, the probe 110 transmits an ultrasonic signal S across some range of frequencies. The frequency for achieving the highest echo height (dB) from the transmitted ultrasonic signal S is now denoted as a frequency f1. The frequency f1 is the center frequency that is at the center of the entire frequency band illustrated in FIG. 8. Note that the frequency f1 does not necessarily coincide with the center frequency. A frequency band within a range corresponding to an echo level lower than the highest echo height E1 by predetermined decibels (generally, 6 (dB)), which is achieved using the decibel drop method, is considered as the effective frequency band of the probe 110. The center frequency (in this example, the frequency f1) is included in this effective frequency band.

Figure 9:
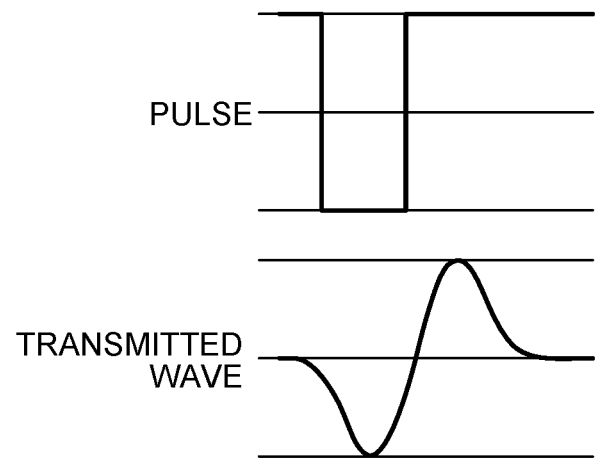
FIG. 9 is a schematic for explaining an example of a voltage pulse applied to a pulser.
Figure 10:
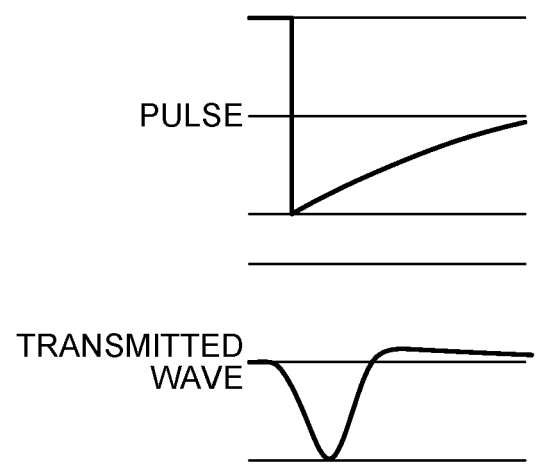
FIG. 10 is a schematic for explaining an example of the voltage pulse applied to the pulser.

FIGS. 9 and 10 are schematics for explaining examples of the voltage pulse applied to the pulser. As illustrated in FIG. 9, when the voltage pulse is a square pulse, by setting the pulse width smaller, a higher-frequency ultrasonic signal can be transmitted. As illustrated in FIG. 10, it is also possible to use a spike pulse for the voltage pulse so that damping effect is increased, so that a substantially half-wave ultrasonic signal S is transmitted.

As explained above, according to the second embodiment, in causing each of the probes 110 to transmit an ultrasonic signal S, the pulse width of the voltage applied to the transducer of the probe 110, that is, the pulser 12 is set so that the ultrasonic signal S at the highest frequency within the effective frequency band of the probe is transmitted. With this configuration, by setting the frequency of the ultrasonic signal S as high as possible within the effective frequency band and making the wavelength short, it becomes possible to increase the scan resolution at the data collecting step. As a result, the internal flaw D can be rendered appropriately in the primary image M even if the position of the internal flaw D is near the contour. In this manner, a user can evaluate the presence of an internal flaw D more easily when the user visually checks as to whether an internal flaw D is present in the primary image M at Step S60 in FIG. 3. Explained in the embodiment described above is an example in which, for the ultrasonic signal S, the frequency is set to high, but by setting the frequency of the ultrasonic signal S as low as possible within the effective frequency band, and extending the wavelength, flaws can be detected across a wider range, although the scan resolution at the data collecting step becomes lower.

Third Embodiment

Figure 11:
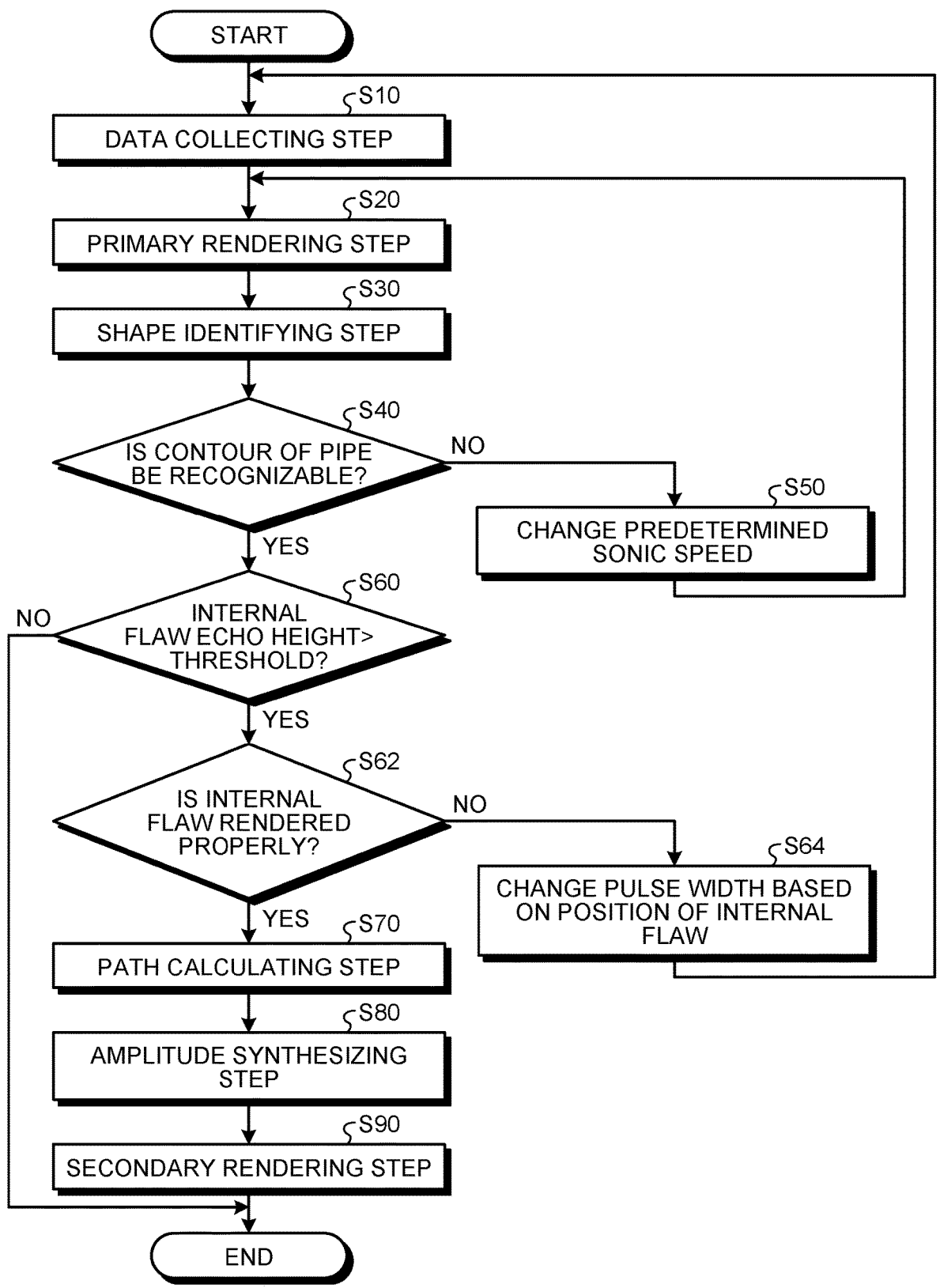
FIG. 11 is a flowchart illustrating an example of a process of an ultrasonic inspection method according to a third embodiment.

An ultrasonic inspection method, an ultrasonic inspection apparatus, and a computer program according to a third embodiment will now be explained. FIG. 11 is a flowchart illustrating an example of a process of the ultrasonic inspection method according to the third embodiment. In terms of the configuration, the ultrasonic inspection apparatus according to the third embodiment is not different from the ultrasonic inspection apparatus according to the first embodiment illustrated in FIG. 1, except that the ultrasonic inspection apparatus performs the process illustrated in FIG. 11. Therefore, explanation of the configuration will be omitted. The ultrasonic inspection method according to the third embodiment is executed by the calculation unit 20, by following a computer program stored in the storage unit 22.

In the process illustrated in FIG. 11, Steps S62 and S64 are performed in addition to the process illustrated in FIG. 3. The other processes from Step S10 to Step S90 are the same as those in the first embodiment, and therefore, the explanation thereof will be omitted.

If the second arithmetic processing unit 24 determines that the internal flaw echo height is equal to or higher than the threshold at Step S60 (Yes at Step S60), it is determined whether the internal flaw D is rendered appropriately in the primary image M at Step S62. "The internal flaw D is rendered appropriately" herein means that the internal flaw D can be distinguished from the contour, that is, the outer surface 1a or the inner surface 1b. In other words, if the internal flaw D (e.g., the internal flaw D1 illustrated in FIG. 4) is too close to the contour (the outer surface 1a), it may not be possible to distinguish the internal flaw D1 from the outer surface 1a appropriately, due to a plurality of echoes, as described in the second embodiment. Therefore, for a pixel P for which the internal flaw echo height is higher than the threshold, if the distance to the contour is less than a first predetermined distance, the second arithmetic processing unit 24 determines that the internal flaw D is not rendered appropriately in the primary image M. By contrast, if the distance to the contour is greater than the first predetermined distance, for the pixel P at which the internal flaw echo height is higher than the threshold, the second arithmetic processing unit 24 determines that the internal flaw D is rendered appropriately in the primary image M.

If the second arithmetic processing unit 24 determines that the internal flaw D is not rendered appropriately in the primary image M (No at Step S62), the system control goes to Step S64 to change the pulse width of the voltage applied to the probes 110, based on the position of the internal flaw D. At this time, it is assumed herein that the contour is too close in distance to the pixel P where the internal flaw echo height is higher than the threshold. As explained in the second embodiment, to improve the resolution of the scan, the pulse width of the voltage applied to the transducer of the probe 110, that is, the pulser 12 is set to a tendency to become smaller so that the ultrasonic signal S at a higher frequency is transmitted. The second arithmetic processing unit 24 then repeats the process of Step S10 and the subsequent step(s) until it is determined at Step S62 that the internal flaw D is rendered appropriately. The pulse width of the voltage may be set to become gradually smaller from the initial value within the effective frequency band of the probe 110, or, as in the second embodiment, it may be set in such a manner that the ultrasonic signal S at the highest frequency in the effective frequency band of the probe 110 is transmitted.

As explained above, in the ultrasonic inspection method according to the third embodiment, the process of Step S1 of collecting data and the subsequent step(s) is repeated with the pulse width of the voltage applied to the probe 110 changed so that the ultrasonic signals S within the effective frequency band of the probe 110 are transmitted until it is determined that the internal flaw D is rendered appropriately, and then the process of Step S1 of collecting data and the subsequent step(s) is repeated. The pulse width is changed so as to have a tendency to make the frequency of the ultrasonic signal S to be transmitted from the probe 110 higher as the internal flaw D is closer to the contour. With this configuration, the internal flaw D can be rendered appropriately in the primary image M, even when the internal flaw D is too close to the contour, for example, so that it is difficult to distinguish the internal flaw D from the contour. In this manner, a user can evaluate the presence of an internal flaw D more easily when the user checks visually whether an internal flaw D is present in the primary image M at Step S60.

In the third embodiment, the determination as to whether the internal flaw D is rendered appropriately in the primary image M at Step S62 is not limited to that based on the distance between the internal flaw D and the contour. When the internal flaw D is positioned at a deeper level in the pipe 1, i.e., at a distance away from the probes 110 (e.g., an internal flaw D2 illustrated in FIG. 4), the ultrasonic signal S may attenuate before reaching the internal flaw D, and the internal flaw echo height, which is the echo height of the reflected wave, may not become sufficiently high.

Therefore, for a pixel P for which the internal flaw echo height is higher than the threshold, if the distance from the plurality of probes 110 is greater than a second predetermined distance, the second arithmetic processing unit 24 determines that the internal flaw D is not rendered appropriately in the primary image M. By contrast, if the distance from the probes 110 is less than the second predetermined distance for the pixel P at which the internal flaw echo height is higher than the threshold, the second arithmetic processing unit 24 determines that the internal flaw D is rendered appropriately in the primary image M. At this time, as mentioned above, in the process of Step S64, the pulse width of the voltage applied to the transducer of the probe 110, that is, the pulser 12, may be set to a tendency to increase so that the low-frequency ultrasonic signals S are transmitted, with an intention for suppressing the attenuation of the ultrasonic signal S as much as possible, and to search a wider range. In the manner described above, the pulse width may be changed to a tendency to make the frequency of the ultrasonic signal transmitted from the probe 110 lower when the distance between the internal flaw D and the probe 110 is larger. In this manner, the internal flaw D can be rendered appropriately in the primary image M, even when the internal flaw D is positioned in a deeper level in the pipe 1. In this manner, a user can evaluate the presence of an internal flaw D more easily when the user checks visually whether an internal flaw D is present in the primary image M at Step S60.

In the third embodiment, Step S62 of determining whether the internal flaw D is rendered appropriately may be performed by the user. In other words, the primary image M may be displayed on the operation/display unit 30, and the user may visually check the points where the reflection echo height is high, in the displayed primary image M to determine whether the internal flaw D is rendered appropriately. In this case, Step S62 and Steps S70 to S90 may be performed by the user giving instructions via the operation/display unit 30, for example.

Fourth Embodiment

Figure 12:
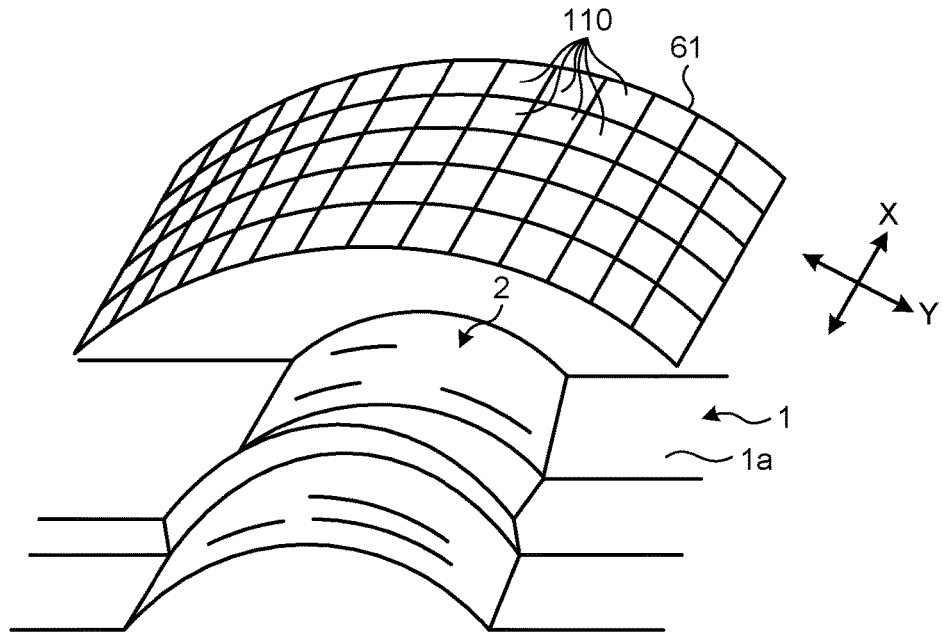
FIG. 12 is a schematic diagram illustrating an example of main portions of an ultrasonic inspection apparatus according to a fourth embodiment.

An ultrasonic inspection method, an ultrasonic inspection apparatus, and a control program according to a fourth embodiment will now be explained. FIG. 12 is a schematic diagram illustrating an example of main portions of an ultrasonic inspection apparatus according to the fourth embodiment. In the first to the third embodiments described above, the calculating process using the linear array probe 11 with the probes 110 arranged in a two-dimensional plane has been explained. The ultrasonic inspection apparatus illustrated in FIG. 12 has a matrix array probe 61 with a plurality of probes 110 arranged in a matrix array in a three-dimensional plane, as illustrated. The other configurations of the ultrasonic inspection apparatus in the third embodiment are the same as those in the first embodiment, and therefore, explanation thereof will be omitted.

The matrix array probe 61, for example, includes N probes 110 arranged in N rows. Therefore, when the data collecting step at Step S1 illustrated in FIG. 3 is performed using the matrix array probe 61, N×N matrix-type data will be collected for each row of the ultrasonic signals S. In other words, N×N×N data will be collected for all probes 110, and this N×N×N data of the ultrasonic signals S will be the data of the pipe 1 as the result of scanning with the ultrasonic signals S. In the fourth embodiment, the calculation unit 20 performs the data synthesizing process illustrated in FIGS. 3 and 11 using the N×N×N data for the ultrasonic signals S described above. With this configuration, by performing the data synthesizing step in a three-dimensional space, it is possible to obtain a wider range of rendering results for the internal side of the pipe 1 at a higher accuracy. In addition, scattered echoes from the internal flaw can be better acquired.

Figure 13:
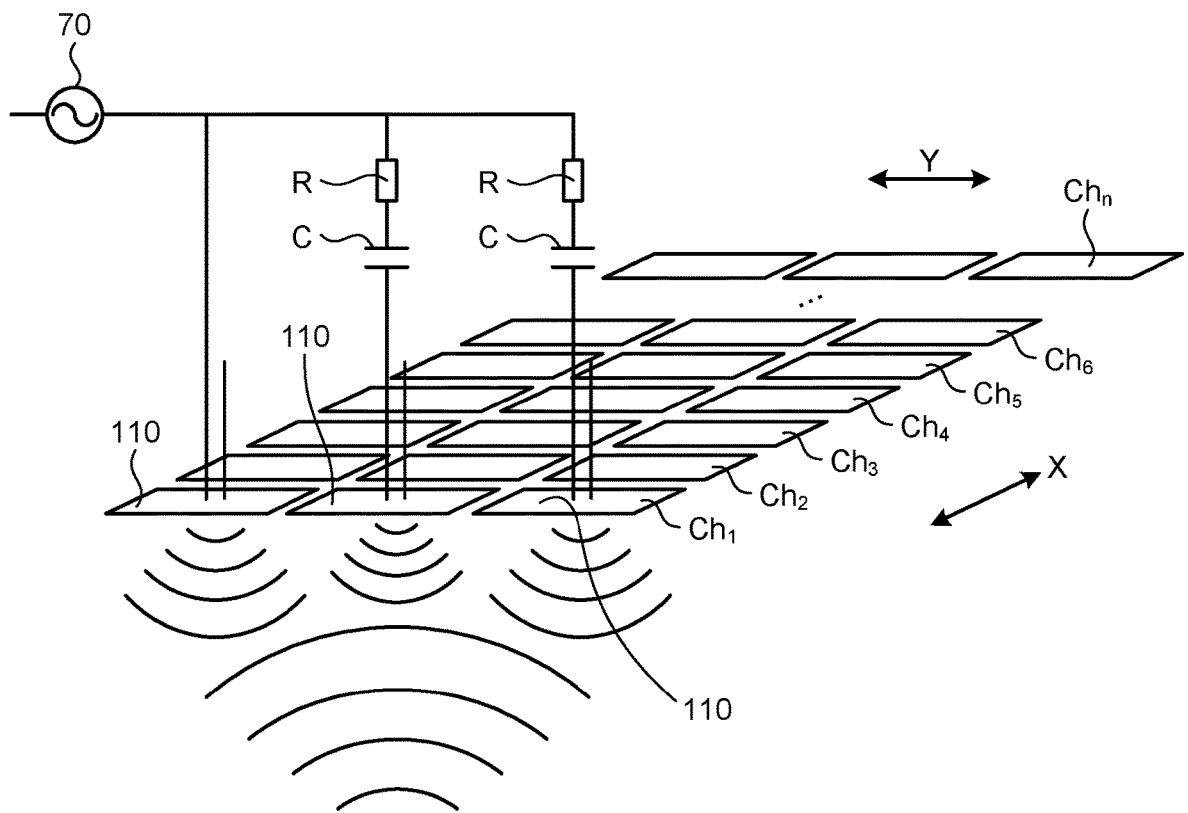
FIG. 13 is a schematic diagram of an example of a configuration in which a voltage is applied to pulsers in a plurality of probes included in a matrix array probe.

FIG. 13 is a schematic diagram of an example of a configuration for applying voltage to the pulsers for the probes included in the matrix array probe. As illustrated in FIGS. 12 and 13, the probes 110 of the matrix array probe 61 are arranged side by side in the width direction of the element and in a direction orthogonal to the width direction. In the explanation herein, the direction orthogonal to the width direction is referred to as a first array direction X, and the width direction is referred to as a second array direction Y.

As illustrated in FIG. 13, different channels $ch_1$ to channel $ch_N$ are assigned to the probes 110 so that different voltages can be applied for each probe 110 in the first array direction X. Different power supply units 70 are connected to the respective channels $ch_1$ to $ch_N$, each of which is independently controlled. Therefore, the delay time of the ultrasonic signals S transmitted from the probes 110 in each of the channels $ch_1$ to $ch_N$ can be controlled independently.

By contrast, in the second array direction Y orthogonal to the first array direction X, the same channel is assigned to the probes 110. Thus, by arranging the probes 110 in a matrix and assigning the same channel to the probes in the second array direction Y, it is possible to output the ultrasonic wave from the oscillation source in a split manner, and detect the received ultrasonic waves in a converged manner, so that an increase in the number of signal processing targets, that is, channels, can be suppressed while enabling flaw detection to be performed across a wide range at once.

However, the delay time of the ultrasonic signals S cannot be controlled for each channel in the second array direction Y. Therefore, in the second array direction Y, a variable resistor R and a variable capacitor C are connected to each of the probes 110 to change the voltage applied thereto. In this manner, by adjusting the resistance of the variable resistor R and the capacitance of the variable capacitor C in the same channel, e.g., the $channel_{ch1}$, it is possible to control the phase delay of the voltage applied to each of the probes 110. As a result, the delay time of the ultrasonic signals S can be controlled for each of the probes 110 in the second array direction Y.

Therefore, even with the matrix array probe 61, the delay time of the ultrasonic signals S can be controlled for each of the probes 110 in both of the first array direction X and the second array direction Y, so that beam focusing can be achieved. In this manner, it is possible to perform the beam focusing without structural restrictions (manufacturing increase restrictions), compared with when the beam focusing is performed by adding curvature to the matrix array probe 61. By using only the first array direction X as the direction in which the channels $ch_1$ to $ch_N$ is assigned, it is possible to limit the number of channels to N only. As a result, the control can be simplified and the apparatus configuration can be made simple, so that the cost is reduced, compared with when the channels are assigned to all of the N×N probes 110.

Such beam focusing may be used when an internal flaw D is detected in the primary image M according to the first to the third embodiments, in controlling to execute the process from Step S1 again in such a manner that the beam focusing is performed targeting at the internal flaw D, so that the internal flaw D can be rendered more appropriately.

In the embodiment described above, by providing the variable resistor R and the variable capacitor C and controlling the delay time, the detection at a higher resolution can be achieved. However, a configuration without the circuit components for introducing delay time between the probes in the same channel is also possible. With this configuration, in the manner described above, it is possible to detect a flaw across a wide range, while suppressing the increase in the number of channels, as described above. By changing the arrangement and the direction of the probe array, it is possible to focus the ultrasonic waves emitted from a plurality of probes to a single point, or to detect a flaw a wider range at once.

REFERENCE SIGNS LIST

1 Pipe
1a Outer surface
1b Inner surface
2 Welded portion
10 Flaw detector
11 Linear array probe
12 Pulser
13 Receiver
14 Data storage unit
15 Control element switching unit
20 Calculating unit
21 Control unit
22 Storage unit
23 First arithmetic processing unit
24 Second arithmetic processing unit
30 Operation/display unit 31 Calculation result display unit
32 Inspection condition setting unit
33 Calculation condition setting unit
61 Matrix array probe
70 Power supply unit
100 Ultrasonic inspection apparatus
110 Probe
C Variable capacitor
$ch_1$, $ch_N$ Channel
D, D1, D2 Internal flaw
R Variable resistor
M Primary image
M' Secondary image
P Pixel
X First array direction
Y Second array direction

The invention claimed is:

1. An ultrasonic inspection method comprising:
collecting data as a result of scanning an inspection target in such a manner that a plurality of probes transmit ultrasonic signals to the inspection target and the probes receive reflected ultrasonic signals from the inspection target;
rendering a primary image including a contour and an internal side of the inspection target based on the data as the result of scanning by using a sonic speed of the ultrasonic signals transmitted and received by the probes, the sonic speed being set to a predetermined value regardless of a region through which the ultrasonic signals have passed;
determining whether the contour is recognizable based on a position of the contour in the primary image; and
evaluating whether an internal flaw is present in the inspection target in the primary image, wherein
a process including the rendering of the primary image and the determining of whether the contour is present and is repeated with the predetermined value for the sonic speed being changed until the contour is determined to be recognizable.

2. The ultrasonic inspection method according to claim 1, wherein the rendering of the primary image uses a single value as the predetermined value.

3. The ultrasonic inspection method according to claim 1, wherein the rendering of the primary image uses as the predetermined value a different sonic speed that is set for a predetermined region.

4. The ultrasonic inspection method according to claim 1, further comprising rendering a secondary image including the contour and the internal side of the inspection target by using a sonic speed of the ultrasonic signals, the sonic speed being set to a value according to each region through which the ultrasonic signals have passed.

5. The ultrasonic inspection method according to claim 1, wherein the step of determining of whether the contour of the inspection target is recognizable includes updating a range where the contour is recognizable by machine learning using a database where data of the inspection targets are accumulated, to determine whether the contour of the inspection target is recognizable.

6. The ultrasonic inspection method according to claim 1, wherein a pulse width of a voltage applied to transducers of the probes used in the collecting of the data is set so that ultrasonic signals at a highest frequency in an effective frequency band of the probes are transmitted from the probes.

7. The ultrasonic inspection method according to claim 1, further comprising determining, after the evaluating of whether the internal flaw is present, whether the internal flaw is rendered appropriately based on a position of the internal flaw in the primary image, wherein
a process including the collecting of the data, the rendering of the primary image, the determining of whether the contour is present, the evaluating of whether the internal flaw is present, and the determining of whether the internal flaw is rendered appropriately is repeated with a pulse width of a voltage applied to the probes being changed so that ultrasonic signals within an effective frequency band of the probes are transmitted until it is determined that the internal flaw is rendered appropriately.

8. The ultrasonic inspection method according to claim 7, wherein the pulse width is changed so as to have a tendency to make a frequency of ultrasonic signals transmitted from the probes higher as the internal flaw is closer to the contour.

9. The ultrasonic inspection method according to claim 7, wherein the pulse width is changed so as to have a tendency to make a frequency of ultrasonic signals transmitted from the probes lower as the internal flaw is farther away from the probes.

10. An ultrasonic inspection apparatus comprising:
a plurality of probes configured to transmit ultrasonic signals to an inspection target via a medium through which the ultrasonic signals propagate, and receive ultrasonic signals reflected from the inspection target; and
an arithmetic processing unit configured to collect data as a result of causing the probes to scan the inspection target with the ultrasonic signals, and process the collected the collected data of ultrasonic signals to synthesize the data, wherein
the arithmetic processing unit is configured to:
collect the data as a result of scanning the inspection target in such a manner that the probes transmit the ultrasonic signals to the inspection target and the probes receive reflected ultrasonic signals from the inspection target;
render a primary image including a contour and an internal side of the inspection target based on the data as the result of scanning by using a sonic speed of the ultrasonic signals transmitted and received by the probes, the sonic speed being set to a predetermined value regardless of a region through which the ultrasonic signals have passed;
determine whether the contour is recognizable based on a position of the contour in the primary image; and
evaluate whether an internal flaw is present in the inspection target in the primary image, and
the arithmetic processing unit is further configured to repeat a process including the rendering of the primary image and the determining of whether the contour is present, with the predetermined value for the sonic speed being changed until the contour is determined to be recognizable.

11. The ultrasonic inspection apparatus according to claim 10, wherein
the probes are arranged in a matrix array,
different channels are assigned to the respective probes arranged in a first array direction of the probes, to enable application of a different voltage, and
a same channel is assigned to the probes arranged in a second array direction, the second array direction being orthogonal to the first array direction of the probes.

12. The ultrasonic inspection apparatus according to claim 11, wherein a variable resistor and a variable capacitor for changing the voltage applied to each of the probes are connected to the each of the probes arranged in the second array direction.

13. A non-transitory computer-readable storage medium storing a computer program for causing a computer to execute:
- collecting data as a result of scanning an inspection target in such a manner that a plurality of probes transmit ultrasonic signals to the inspection target and the probes receive reflected ultrasonic signals from the inspection target;
- rendering a primary image including a contour and an internal side of the inspection target based on the data as the result of scanning by using a sonic speed of the ultrasonic signals transmitted and received by the probes, the sonic speed being set to a predetermined value regardless of a region through which the ultrasonic signals have passed;
- determining whether the contour is recognizable based on a position of the contour in the primary image; and
- evaluating whether an internal flaw is present in the inspection target in the primary image, wherein
- a process including the rendering of the primary image and the determining of whether the contour is present is repeated with the predetermined value for the sonic speed being changed until the contour is determined to be recognizable.

* * * * *